US006762986B1

(12) United States Patent
Seo

(10) Patent No.: US 6,762,986 B1
(45) Date of Patent: Jul. 13, 2004

(54) METHOD OF GENERATING WRITE PULSE CONTROL SIGNALS FOR VARIOUS TYPES OF OPTICAL RECORDING MEDIA AND RECORDING APPARATUS ADOPTING THE SAME

(75) Inventor: Jin-gyo Seo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/515,516

(22) Filed: Feb. 29, 2000

(30) Foreign Application Priority Data

Jun. 3, 1999 (KR) .................................... 1999-0020485

(51) Int. Cl.[7] .......................................... G11B 7/0045
(52) U.S. Cl. .............................. 369/59.12; 369/47.51; 369/116
(58) Field of Search .......................... 369/59.11, 59.12, 369/47.51, 116

(56) References Cited

U.S. PATENT DOCUMENTS

| | | | | |
|---|---|---|---|---|
| 3,711,756 A | * | 1/1973 | Ogiso | 318/162 |
| 4,873,680 A | * | 10/1989 | Chung et al. | 369/59.12 |
| 5,155,719 A | * | 10/1992 | Masakawa | 369/47.52 |
| 5,708,636 A | * | 1/1998 | Takahashi et al. | 369/44.41 |
| 5,802,031 A | | 9/1998 | Clark et al. | |
| 6,222,814 B1 | * | 4/2001 | Ichimura | 369/116 |
| 6,285,647 B1 | * | 9/2001 | Van Woudenberg et al. | 369/116 |
| 6,343,056 B2 | * | 1/2002 | Miyamoto et al. | 369/59.11 |
| 6,396,792 B1 | * | 5/2002 | Ichihara | 369/47.5 |
| 6,407,976 B2 | * | 6/2002 | Nagara et al. | 369/116 |
| 6,483,791 B1 | * | 11/2002 | Asada et al. | 369/59.11 |

FOREIGN PATENT DOCUMENTS

| | | |
|---|---|---|
| EP | 0 288 114 | 10/1988 |
| EP | 0 978 827 A2 | 2/2000 |
| JP | 8-287465 | 11/1996 |
| JP | 9-282661 | 10/1997 |
| JP | 11-120563 | 4/1999 |
| WO | WO 93/10527 | 5/1993 |

\* cited by examiner

Primary Examiner—Gautam R. Patel
(74) Attorney, Agent, or Firm—Staas & Halsey LLP

(57) ABSTRACT

A method of generating write pulse control signals adaptive to various optical recording media, and a recording apparatus adopting the method. In the write pulse control signal generating method, timing data is made with respect to starting and/or ending positions of pulses, relative to rising and falling edges of a mark, wherein the timing data includes a first pulses, a multi-pulse train, a last pulse and a cooling pulse, and the starting and ending positions of the pulses are varied for various optical recording media. The timing data is stored, and then a bias power control signal, an erase power control signal, a peak power control signal and a cooling power control signal are generated in synchronism with an input nonreturn to zero inverted (NRZI) signal, based on the timing data for each optical recording medium. The recording apparatus can store write pulses, which are adaptive to various optical recording media, in the form of timing data, and generate base signals based on the timing data. Also, the write pulse control signals can be generated by the base signals, which controls timing of the write pulses such that the optical recording can be realized adaptive to various optical recording media.

30 Claims, 8 Drawing Sheets

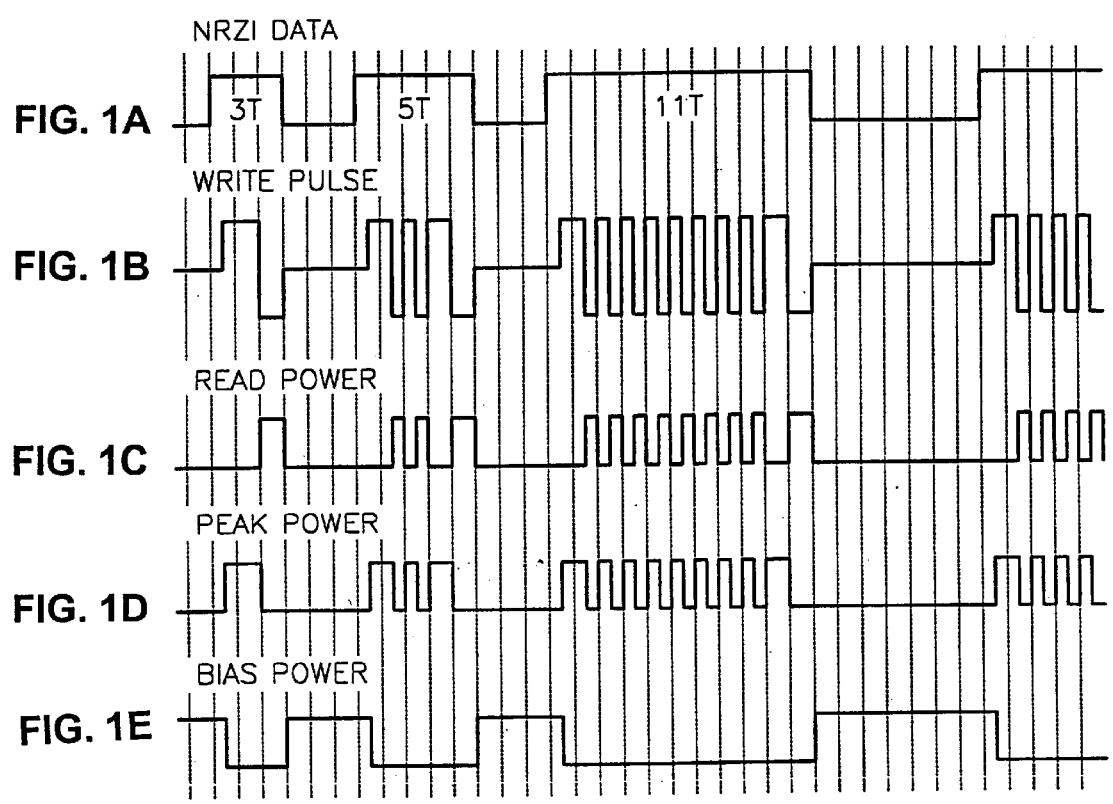

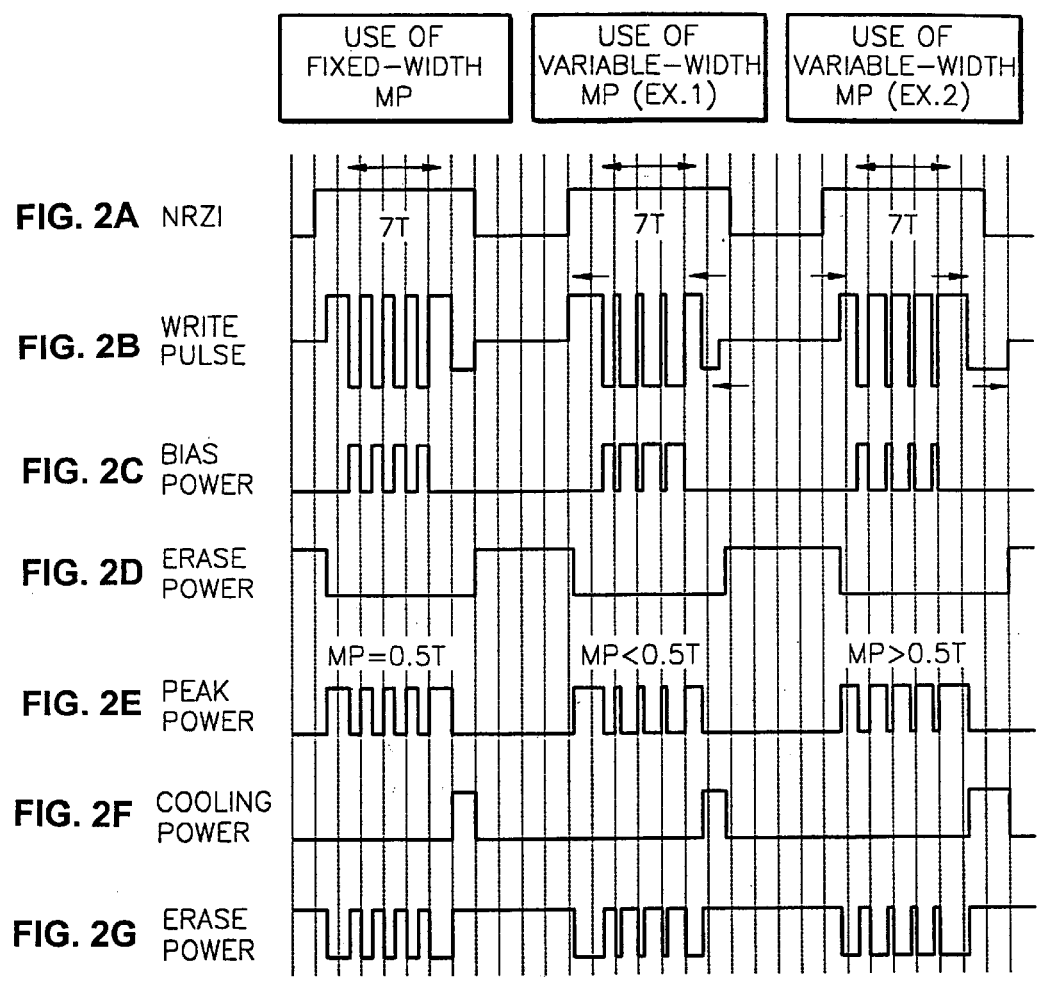

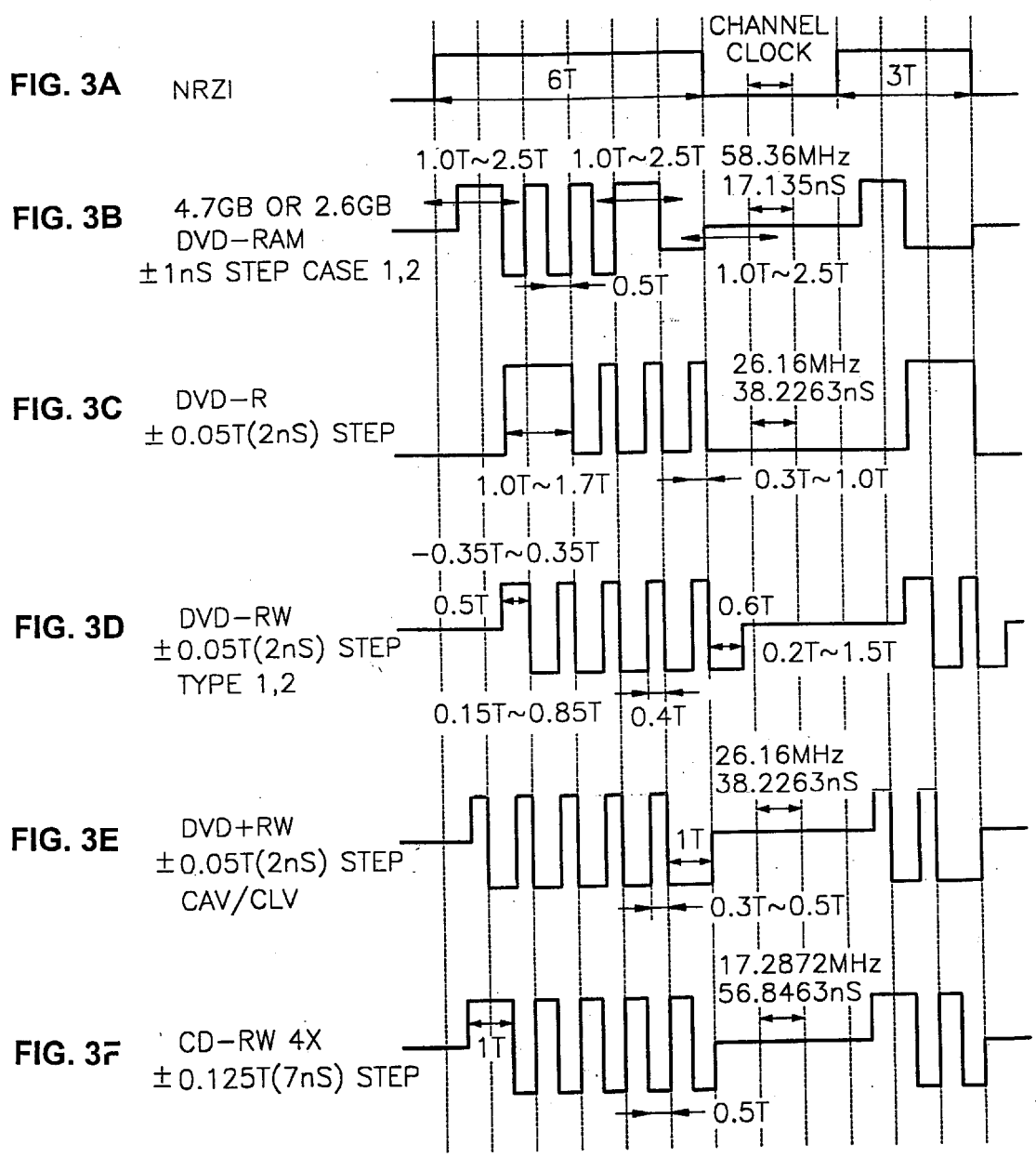

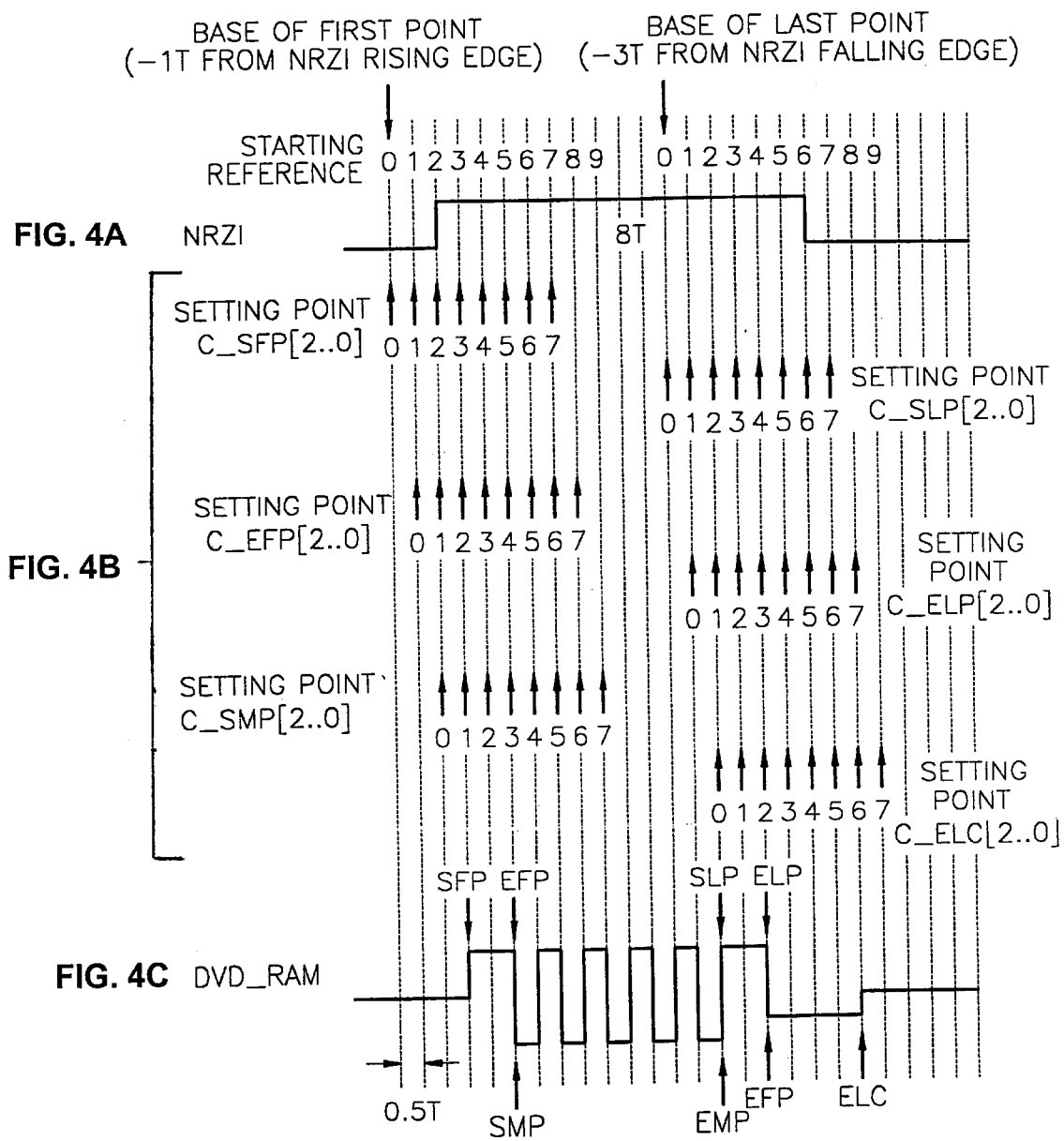
BASE SETTING IS C_SFP[2..0]=3, C_EFP[2..0]=4, C_SMP[2..0]=3, C_SLP[2..0]=2, C_ELP[2..0]=3 and C_ELC[2..0]=4 FOR DVD-RAM

FIG. 5F  NRZI

FIG. 5A  4.7GB OR 2.6GB
DVD-RAM
±1nS STEP CASE 1,2

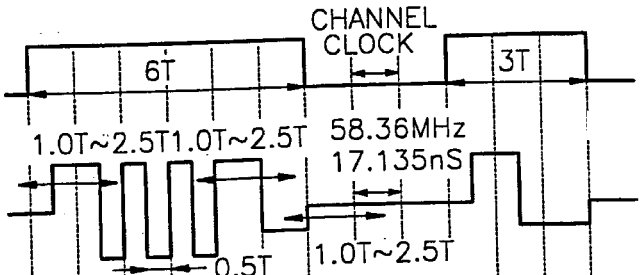

BASE SETTING IS C_SFP[2..0]=3, C_EFP[2..0]=4, C_SMP[2..0]=3,
C_SLP[2..0]=2, C_ELP[2..0]=3 AND C_ELC[2..0]=4

FIG. 5B  DVD-R
±0.05T(2nS) STEP

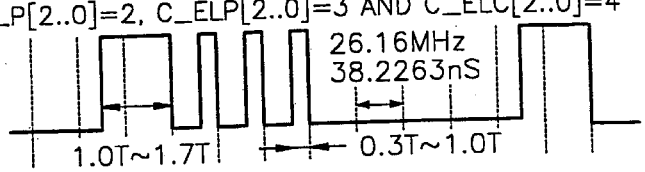

BASE SETTING IS C_SFP[2..0]=4, C_EFP[2..0]=6, C_SMP[2..0]=5,
C_SLP[2..0]=4, C_ELP[2..0]=3 AND C_ELC[2..0]=2

FIG. 5C  DVD-RW
± 0.05T(2nS) STEP
TYPE 1, 2

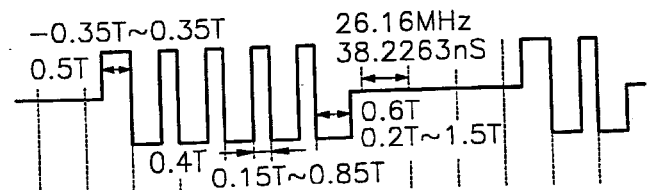

BASE SETTING IS C_SFP[2..0]=3, C_EFP[2..0]=4, C_SMP[2..0]=3,
C_SLP[2..0]=4, C_ELP[2..0]=3 AND C_ELC[2..0]=4

FIG. 5D  DVD+RW
±0.05T(2nS) STEP
CAV/CLV

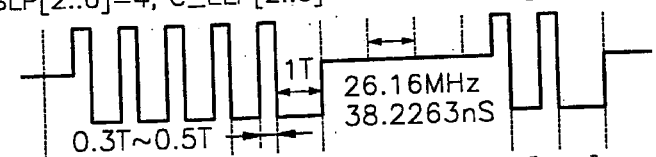

BASE SETTING IS C_SFP[2..0]=2, C_EFP[2..0]=1, C_SMP[2..0]=1,
C_SLP[2..0]=2, C_ELP[2..0]=1 AND C_ELC[2..0]=3

FIG. 5E  CD-RW 4X
±0.125T(7nS) STEP

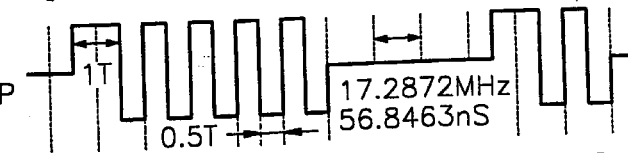

BASE SETTING IS C_SFP[2..0]=3, C_EFP[2..0]=4, C_SMP[2..0]=2,
C_SLP[2..0]=2, C_ELP[2..0]=2 AND C_ELC[2..0]=2

METHOD OF GENERATING WRITE PULSE CONTROL SIGNALS FOR VARIOUS TYPES OF OPTICAL RECORDING MEDIA AND RECORDING APPARATUS ADOPTING THE SAME

CROSS-REFERENCE TO RELATED APPLICATIONS

This application claims the benefit of Korean Application No.99-20485, filed Jun. 3, 1999, in the Korean Patent Office, the disclosure of which is incorporated herein by reference.

BACKGROUND OF THE INVENTION

1. Field of the Invention

The present invention relates to a method and apparatus for high density optical recording, and more particularly, to a method of generating write pulse control signals adaptive to various optical recording media, and a recording apparatus adopting the same.

2. Description of the Related Art

With the advent of multimedia, the demand for high capacity recording media has increased. Such high-capacity recording media include digital versatile disk-random access memory (DVD-RAM), DVD-recordable (DVD-R), DVD-rewritable (DVD-RW), DVD+RW and compact disc-RW (CD-RW).

An ideal optical disc recording apparatus is one that can read or write information from or to various optical recording media such as DVD-RAM, DVD-R, DVD-RW, DVD+RW and CD-RW. However, due to different recording characteristics between optical recording media, the type of write pulse also differs depending on the type of recording media. For this reason, in order to record data on various types of optical recording media, an optical disc recording apparatus must include a plurality of apparatuses, each of which is individually available in a specific optical recording medium, capable of generating various write pulses. Thus, the amount of hardware becomes excessive.

SUMMARY OF THE INVENTION

An object of the present invention is to provide a write pulse control signal generating method by which write pulse control signals suitable for various optical recording media can be easily generated.

Another object of the present invention is to provide a recording apparatus adopting the write pulse control signal generating method.

In an aspect of the present invention, there is provided a method for generating write pulse control signals which are adaptive to various optical recording media, the method comprising the steps of: (a) making timing data with respect to starting and/or ending positions of pulses, relative to rising and falling edges of a mark, wherein the timing data comprises a first pulses, a multi-pulse train, a last pulse and a cooling pulse, and the starting and ending positions of the pulses are varied for various optical recording media; (b) storing the timing data from the step (a); and (c) generating a bias power control signal, an erase power control signal, a peak power control signal and a cooling power control signal in synchronism with an input nonreturn to zero inverted (NRZI) signal, based on the timing data for each optical recording medium.

In another aspect of the present invention, there is provided a recording apparatus which is adaptive to various optical recording media, the recording apparatus comprising: a microcomputer for storing timing data which represent starting and ending positions of a first pulse, a multi-pulse train, a last pulse and a cooling pulse which constitute write pulses for each optical recording medium, the timing data obtained relative to rising and falling edges of the mark; a base signal generation unit for generating base signals which are used to generate write pulse control signals based on the timing data from the microcomputer, in synchronism with an nonreturn to zero inverted (NRZI) signal; a write waveform generation unit for generating the write pulse control signals in response to the base signals from the base signal generation unit; and a laser diode driver for driving a laser diode in response to the write pulse control signals from the write waveform generation unit.

Additional objects and advantages of the invention will be set forth in part in the description which follows, and, in part, will be obvious from the description, or may be learned by practice of the invention.

BRIEF DESCRIPTION OF THE DRAWINGS

The above objects and advantages of the present invention will become more apparent by describing in detail preferred embodiments thereof with reference to the attached drawings in which:

FIGS. 1A–1E show waveforms of write pulses for use in forming marks;

FIGS. 2A–2G show waveforms of other write pulses for forming a write mark;

FIGS. 3A–3F show waveforms of write pulses for each optical recording medium, corresponding to an input non-return to zero inverted (NRZI) signal;

FIGS. 4A–4C illustrate a write pulse control signal generating method according to the present invention;

FIGS. 5A–5F show waveforms of write pulses for each optical recording medium with respect to the settings of Table 1;

DESCRIPTION OF THE PREFERRED EMBODIMENTS

Figure 6:
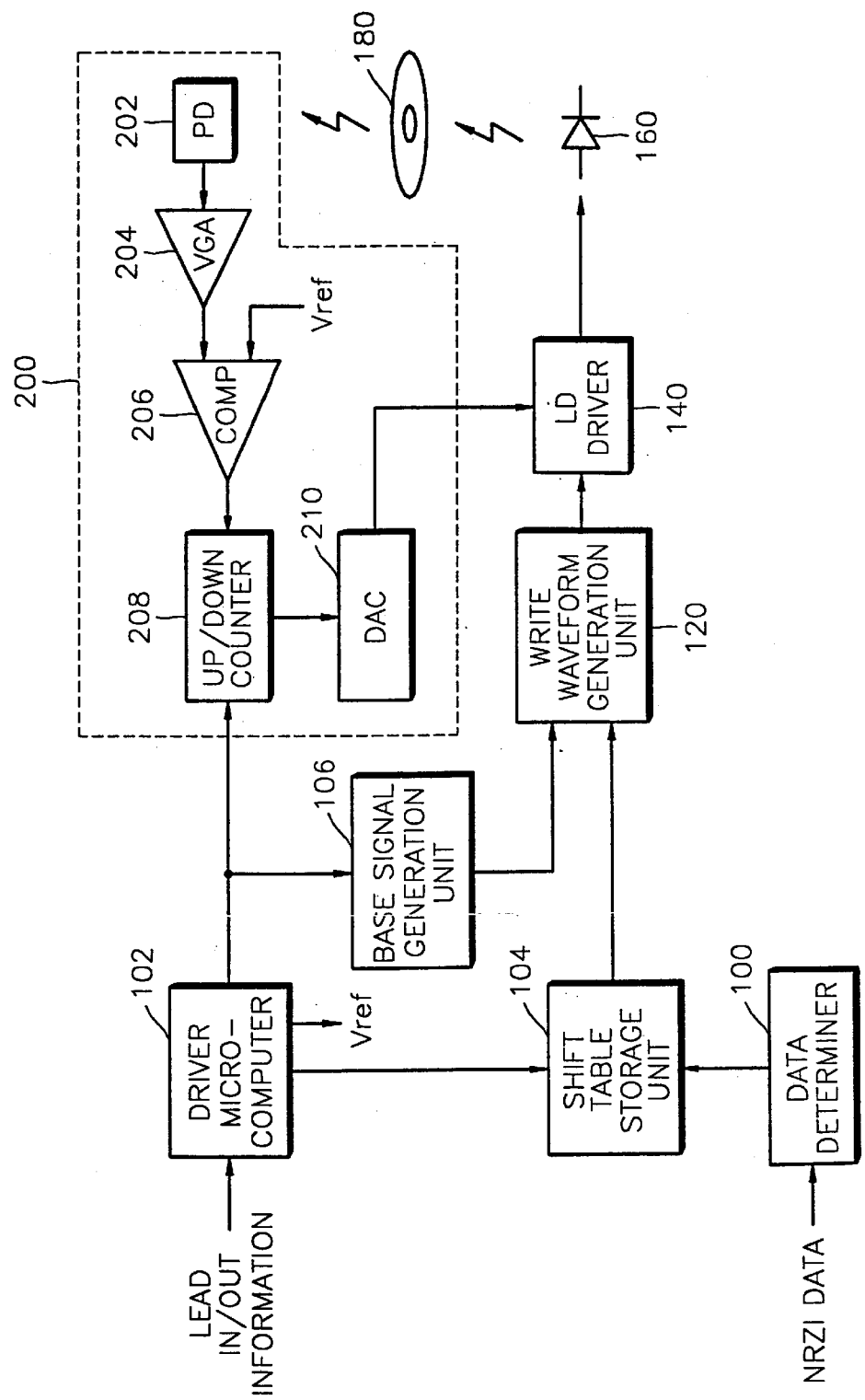
FIG. 6 is a block diagram of a recording apparatus according to the present invention.

Reference will now be made in detail to the present preferred embodiments of the present invention, examples of which are illustrated in the accompanying drawings, wherein like reference numerals refer to like elements throughout.

FIGS. 1A–1E show waveforms of write pulses for use in forming marks. The FIG. 1A waveform represents non return to zero inverted (NRZI) data, and the FIG. 1B waveform represents write pulses which are used in recording the data of the FIG. 1A waveform on a disk. The write pulses of the FIG. 1B waveform are the combination of a read power control signal READ POWER of a FIG. 1C waveform, a peak power control signal PEAK POWER of a FIG. 1D waveform, and a bias power control signal BIAS POWER of a FIG. 1E waveform. A write waveform generator receives the NRZI signal of the FIG. 1A waveform to generate the control signals illustrated in the FIG. 1C through FIG. 1E waveforms. When the write waveform generator provides the control signals to a laser diode driver, the laser diode driver drives a laser diode to generate the write pulses shown in the FIG. 1B. The FIGS. 1A–1E waveforms illustrate the case where write pulses are generated using three control signals.

FIGS. 2A–2G show a set of waveforms of other write pulses for use in forming marks when four control signals are used. A FIG. 2A waveform represents NRZI data, a FIG. 2B waveform represents write pulses which are used in recording the data of the FIG. 2A waveform on a disc. The write pulses of the FIG. 2B waveform are the combination of a bias power control signal BIAS POWER of a FIG. 2C waveform, an erase power control signal ERASE POWER of a FIG. 2D waveform, a peak power control signal PEAK POWER of a FIG. 2E waveform and a cooling power control signal COOLING POWER of a FIG. 2F waveform.

The write pulses of the FIG. 1B waveform conforms to a 2.6 gigabyte (GB) DVD-RAM standard. According to a 2.6 GB DVD-RAM standard, a write pulse consists of a first pulse, a multi-pulse train, a last pulse and a cooling pulse. Also, the number of multiple pulses varies depending on the length of the mark while a first pulse and a last pulse are always present.

The first pulse is for forming a rising edge of a mark. The multi-pulse train, which is interposed between the first pulse and the last pulse, consists of a plurality of pulses in order to lower the unevenness of marks, which occurs due to the concentration of heat, wherein the number of pulses depends on the length of the mark. The last pulse is for forming a trailing edge of a mark, and the cooling pulse, which is located at the rear of the last pulse, is for preventing the mark from becoming too long.

Optical recording media such as DVD-RAM, DVD-R, DVD-RW, DVD+RW or CD-RW have different recording characteristics. Although the mark has an equal length in each optical recording medium, shapes of write pulses differ according to the type of recording mediums or the recording speed. In particular, the starting positions and the length of the first pulse, the multi-pulse train, the last pulse and the cooling pulse are different.

For adaptively recording to optical recording media, the first pulse, the multi-pulse train, the last pulse, the cooling pulse and the like are shifted in the time domain in order to eliminate jitter from the mark. Such cases are illustrated in the middle and right columns of the FIGS. 2A–2G waveforms.

FIGS. 3A–3F show waveforms illustrating the shapes of write pulses for each optical recording medium which correspond to an input NRZI signal. In particular, a FIG. 3A waveform represents an input NRZI signal, a FIG. 3B waveform represents write pulses in a 2.6 GB DVD-RAM or a 4.7 GB DVD-RAM, a FIG. 3C waveform represents write pulses in a DVD-R, a FIG. 3D waveform represents write pulses in a DVD-RW, a FIG. 3E waveform represents write pulses a DVD+RW, and a FIG. 4F waveform represents a quad speed CD-RW.

As shown in FIGS. 3A–3F, because the shapes of the write pulses differ in each optical recording medium, the writing apparatus of the present invention, which adaptively records to multiple optical recording media, is advantageous when compared with a recording apparatus which requires a plurality of write waveform generators, one generator suitable for each recording medium. Thus, the adaptive device of the present invention can be constructed with less hardware than an apparatus which requires multiple waveform generators.

In a write pulse control signal generating method according to the present invention, the starting position and ending position of each pulse constituting the write pulses are tabulated as timing data, and the timing data stored in the table are read in synchronism with an input NRZI signal, and write pulse control signals are generated by the read timing data.

FIGS. 4A–4C and FIGS. 5A–5E are diagrams illustrating a write pulse control signal generating method according to the present invention. A FIG. 4A waveform represents an input NRZI signal, FIG. 4B waveform represents setting points based on which timing data for the starting and ending positions of a first pulse, a multi-pulse train, a last pulse and a cooling pulse are to be obtained, and a FIG. 4C waveform represents an example of a write pulse, which is generated based on the timing data, in a DVD-RAM.

Referring now to FIG. 4C, in order to obtain timing data for the starting position of the first pulse, eight setting points C_SFP[2 . . . 0] before and after a rising edge of a mark are set with an equal interval. The starting position of the first pulse is designated by a 3-bit information which determines one of the eight setting points C_SFP[2 . . . 0] as the starting position of the first pulse. The notation form [X . . . 0], where X is a number, refers to a name of a bit in digital signals of the X+1 digit. For example, [7 . . . 0] means bits from the 7th to the 0th bit.

In order to obtain timing data for the ending position of the first pulse, eight setting points C_EFP[2 . . . 0] before and after the rising edge of the mark are set with an equal interval. The ending position of the first pulse is designated by 3 bits of information which determines one of the eight setting points C_EFP[2 . . . 0] as the ending position of the first pulse.

Preferably, the base of the setting points C_SFP[2 . . . 0] for representing the starting position of the first pulse, and that of the setting points C_EFP[2 . . . 0] for representing the ending position of the first pulse, have a predetermined interval. Since the first pulse has a width of at least 0.5T, the base of the first point C_SFP[0] of the setting points C_SFP[2 . . . 0] for the starting position of the first pulse is separated by 0.5T from the base of the first point C_EFP[0] of the setting points C_EFP[2 . . . 0] for the ending position of the first pulse. Here, "T" represents a cycle of a reference clock for each optical recording medium.

In order to obtain timing data for the starting position of the multi-pulse train, eight setting points C_SMP[2 . . . 0] before and after the rising edge of the mark are set with an equal interval. The starting position of the multi-pulse train may be determined by one of the setting points C_SMP[2 . . . 0].

Preferably, the base of the first point of the setting points C_SFP[2 . . . 0] for the starting position of the first pulse is separated by a predetermined interval from base of the first point of the setting points C_SMP[2 . . . 0] for the starting position of the multi-pulse train. Since the starting position of the first pulse is separated by at least 1T from that of the multi-pulse train, the base of the first point C_SFP[0] of the setting points for the starting position of the first pulse is separated by 1T from the base of the setting points for the starting position of the multi-pulse train. The ending position of the multi-pulse train corresponds to the starting position of the last pulse, so that determination of the ending position of the multi-pulse train is not specified.

In order to obtain timing data for the starting position of the last pulse, eight setting points C_SLP[2 . . . 0] before and after a falling edge of the mark are set with an equal interval. The starting position of the last pulse is designated by 3 bits of information which determines one of the eight setting points C_SLP[2 . . . 0] as the starting position of the last pulse.

In order to obtain timing data for the ending position of the last pulse, eight setting points C_ELP[2 . . . 0] before and after the falling edge of the mark are set with an equal interval. The ending position of the last pulse is designated by 3 bits of information which determines one of the eight setting points C_ELP[2 . . . 0] as the ending position of the last pulse.

Preferably, the base of the setting points C_SLP[2 . . . 0] for representing the starting position of the last pulse, and that of the setting points C_ELP[2 . . . 0] for representing the ending position of the last pulse have a predetermined interval. Since the last pulse has a width of at least 0.5T, the base of the setting points C_SLP[2 . . . 0] for the starting position of the last pulse is separated by 0.5T from the base of the setting points C_ELP[2 . . . 0] for the ending position of the last pulse.

The starting position of the cooling pulse corresponds to the ending position of the last pulse, so that the starting position of the cooling pulse is not separately determined. For timing data for the ending position of the cooling pulse, eight setting points C_ELC[2 . . . 0] before and after the falling edge of the mark are set with an equal interval. The ending position of the cooling pulse is designated by one of the setting points C_ELC[2 . . . 0].

Preferably, the base of the setting points C_ELP[2 . . . 0] for representing the ending position of the last pulse, and base of the setting points C_ELC[2 . . . 0] for representing the ending position of the cooling pulse have a predetermined interval. Since the cooling pulse has a width of at least 1T, the base of the setting points C_ELP[2 . . . 0] for the ending position of the last pulse is separated by 1T from the base of the setting points C_ELC[2 . . . 0] for the ending position of the cooling pulse. The timing data C_SFP[2 . . . 0], C_EFP[2 . . . 0], C_SMP[2 . . . 0], C_SLP[2 . . . 0], C_ELP[2 . . . 0], and C_ELC[2 . . . 0] are are output from microcomputer 102.

As illustrated in FIGS. 4A–4C, the timing data for the write pulses, which are adaptive to various optical recording media, is obtained based on the setting points. Table 1 shows an example of a table used to generate write pulses according to the type of optical recording medium.

shown in FIG. 5F. The FIG. 5A waveform represents write pulses for a 4.7 GB DVD-RAM or a 2.6 GB DVD-RAM and a FIG. 5B waveform represents write pulses for a DVD-R, a FIG. 5C waveform represents write pulses for a DVD-RW, a FIG. 5D waveform represents write pulses for a DVD+RW, and a FIG. 5E waveform represents write pulses for a quad speed CD-RW. Appropriate values for the settings are set out in Table 1. For example, the FIG. 5A waveform is of a write signal for a DVD-RAM where C_SFP[2 . . . 0]=3, C_EFP[2 . . . 0]=4, C_SMP[2 . . . 0]=3, C_SLP[2 . . . 0]=2, C_ELP[2 . . . 0]=3 and C_ELC[2 . . . 0]=4. As shown in Table 1, this set of values corresponds to the settings for a 2.6 GB DVD-RAM.

FIG. 6 is a block diagram of a recording apparatus according to the present invention. The recording apparatus of FIG. 6 is for adaptively recording to each optical recording medium, in which the position of write pulses is shifted based on correlation between the current mark and the preceding and following spaces of the current mark. The recording apparatus includes a data determinator 100, a write waveform generation unit 120, a laser diode (LD) driver 140, an LD 160, an automatic laser-diode power control (ALPC) circuit 200, a driver microcomputer 102, a shift table storage unit 104 to store a table of variations of write pulses in a time domain, and a base signal generation unit 106.

The ALPC circuit 200, which includes a photo diode (PD) 202, a variable gain amplifier (VGA) 204, a comparator (COMP) 206, an up/down counter 208, and a digital-to-analog converter (DAC) 210, performs ADPC operation to maintain the level of an optical signal that is output from the LD 160.

The level of write pulses from the LD 160 is controlled by optical output control data provided by the up/down counter 208 via DAC 210 of the ALPC circuit 200. The PD 202, a light receiving device, receives an optical signal reflected by the disc 180 and converts this optical signal to an electrical signal which will be referred to as a reflected optical signal. The VGA 204 amplifies the reflected optical signal supplied by the PD 202. Also, the COMP 206 compares the voltage level output from the VGA 240 and a reference voltage Vref provided by the driver microcomputer 102. Here, the level of reference voltage Vref is determined according to the power of write pulses required in a normal record mode. The up/down counter 208 performs downcounting if the COMP 206 determines that the level of the amplified reflected

TABLE 1

| | Based Setting Point Value | | | | | |
|---|---|---|---|---|---|---|
| Media Type | C_SFP [2 . . . 0) | C_EFP [2 . . . 0] | C_SLP [2 . . . 0] | C_ELP [2 . . . 0] | C_SMP [2 . . . 0] | C_ELC [2 . . . 0] |
| 4.7 GB DVD – RAM | 2 | 3 | 2 | 3 | 2 | 4 |
| 2.6 GB DVD – RAM | 3 | 4 | 2 | 3 | 3 | 4 |
| DVD – R | 4 | 6 | 4 | 3 | 5 | 2 |
| DVD – RW | 3 | 4 | 4 | 3 | 3 | 4 |
| DVD + RW | 2 | 1 | 2 | 1 | 1 | 3 |
| CD – RW 4X | 3 | 4 | 2 | 2 | 2 | 2 |

The base of the setting points C_SFP[2 . . . 0] precedes the rising edge of the NRZI signal by 1T. The base of the setting points C_SLP[2 . . . 0] precedes the falling edge of the NRZI signal by 3T.

FIGS. 5A–5E show waveforms of write pulses at the setting point values of Table 1 according to the types of optical recording medium as related to the NRZI signal optical signal is higher than the reference voltage Vref. Otherwise, the up/down counter 208 performs upcounting. The count result of the up/down counter 208 is provided as optical output control data to the LD driver 140 through the DAC 210. During normal record mode, the optical output control data from the up/down counter 208 is provided to the DAC 210.

The recording apparatus of FIG. 6 operates both in a normal record mode and an adaptive record mode. In the normal record mode, write pulse control signals are generated according to signals (hereinafter, referred to as base signals) generated by the base signal generation unit 106. The base signal includes a first pulse start signal S_SFP, a first pulse end signal S_EFP, a multi-pulse train start signal S_SMP, a fixed width multi-pulse train signal MP, a variable-width multi-pulse train start signal MP_S, a variable-width multi-pulse train end signal MP_E, a last pulse start signal S_SLP, a last pulse end signal S_ELP and a cooling pulse end signal S_ELC.

Also, in the adaptive record mode, the write pulse control signals are shifted based on time domain shift information stored in the shift table storage unit 104, in response to the base signals generated in the base signal generation unit 106.

In the recording apparatus of FIG. 6, the shift table storage unit 104, which stores a table of data relating to variations of write pulses which enables write pulses to be reproduced in a time domain according to correlation between a mark and the preceding and following spaces of the mark, is initialized in synchronism with the initiation of the driver microcomputer 102. During the initiation of the shift table storage unit 104, the driver microcomputer 102 reads a shift table recorded in a lead-in/out area, and stores the shift table in the shift table storage unit 104. The data relating to variations of write pulses in the time domain according to the correlation between a mark and the preceding and following spaces of the mark, which are tabulated in the shift table, are essential for optimal recording.

In adaptive recording according to the type of optical recording medium, the write waveform generation unit 120 shifts the write pulses generated by the LD 160 in the time domain based on the variations of write pulses in the time domain which are stored in the shift table storage unit 104. The variations of write pulses in the time domain according to the correlation between a mark and the preceding and following spaces of the mark may differ depending on the type of the disc 180, and are usually investigated and recorded in the lead-in/out area of the disc 180 by a manufacturer.

The data determinator 100 receives NRZI data and determines the correlation between a mark and the preceding and following spaces of the mark, and provides the shift table storage unit 104 with the determination result. The shift table storage unit 104 provides the variations of write pulses in the time domain based on the determination result from the data determinator 100 to the write waveform generation unit 120. The write waveform generation unit 120 generates write pulse control signals with reference to the variations of write pulses in the time domain, which are provided by the shift table storage unit 104, in response to the base signal from the base signal generation unit 106. The write pulses generated by the write waveform generation unit 120 are provided to the LD driver 140.

The LD driver 140 drives the LD 160 in response to the signals from the write waveform generation unit 120, for example, a record power control signal, an erase power control signal, a bias power control signal and a cooling power control signal, such that write pulses are generated.

For example, when the NRZI data of the FIG. 2A waveform is input to the data determiner 100, the write waveform generation unit 120 generates the control signals BIAS POWER (FIG. 2C waveform), ERASE POWER (FIG. 2D waveform), PEAK POWER (FIG. 2E waveform) and COOLING POWER (FIG. 2F waveform). Then, the LD driver 140 controls the LD 160 in response to the write pulse control signals applied from the write waveform generation unit 120 such that the write pulses having the FIG. 2B waveform are generated.

The LD driver 140 controls the output level of the LD 160 in accordance with the write pulse control signals, and the optical output control data from the DAC 210. The write pulses generated by the LD 160 are irradiated onto the disc 180 such that data are recorded thereon. The position of the write pulses generated by the LD 160 are adaptively varied as shown in the middle and right of FIG. 2 portions of FIGS. 2A–2G associated with the headings EX.1 and EX.2, respectively, according to the correlation between the mark and the preceding and following spaces of the mark.

Figure 7:
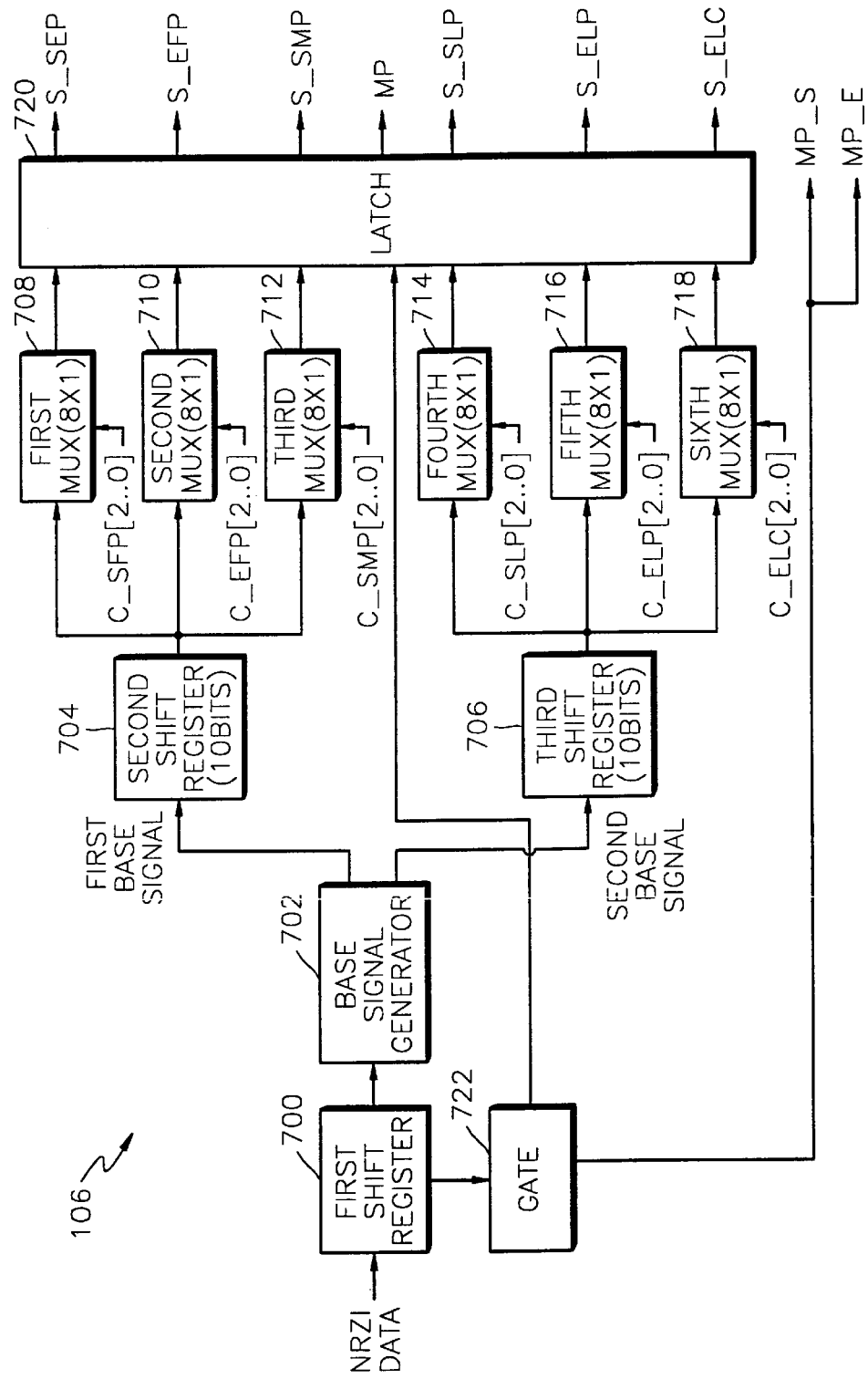
FIG. 7 is a block diagram showing the structure of the base signal generation unit of FIG. 6.

FIG. 7 is a block diagram showing a detailed structure of the base signal generation unit 106 of FIG. 6. The base signal generation unit includes a first shift register 700, a base signal generator 702, a second shift register 704, a third shift register 706, a plurality of multiplexers (MUXs) 708, 710, 712, 714, 716, and 718, a latch 720 and a gate 722. The first shift register 700 shifts an input NRZI signal and applies the shifted signal to the base signal generator 702. The base signal generator 702 generates a base signal based on the shifted NRZI signal. This base signal includes a first base pulse which is generated 1T in advance of the rising edge of a mark of the NRZI signal from the first shift register 700, and a second base pulse which is generated 3T in advance of the falling edge of the mark. The first base pulse represents the base point (first base point) of the setting points C_SFP[2 . . . 0] for the starting position of the first pulse, and the second base signal represents the base point (second base point) of the setting points C_SLP[2 . . . 0] for the starting position of the last pulse (see FIGS. 4A–4C).

The second shift register 704 outputs 10 pulse signals (first setting signals) with an interval of 0.5T therebetween, wherein the last pulse signal is shifted by 5T. The first through eighth pulse signals of the 10 pulse signals from the second shift register 704, which correspond to the setting points C_SFP[2 . . . 0] for the starting position of the first pulse (see FIGS. 4A–4C), are input to the first MUX 708. The first MUX 708 selectively outputs one of the eight pulse signals to the write waveform generation unit 120, via the latch 720, depending on the type of optical recording medium used. The output of the first MUX 708 is a first pulse start signal S_SFP that indicates the starting position of the first pulse.

The second through ninth pulse signals of the 10 pulse signals from the second shift register 704, which correspond to the setting points C_EFP[2 . . . 0] for the ending position of the first pulse (see FIGS. 4A–4C), are input to the second MUX 710. The second MUX 710 selectively outputs one of the eight pulse signals to the write waveform generation unit 120, via the latch 720, depending on the type of optical recording medium used. The output of the second MUX 710 is a first pulse end signal S_EFP that indicates the ending position of the first pulse. The third through tenth pulse signals of the 10 pulse signals from the second shift register 704, which correspond to the setting points C_SMP[2 . . . 0] for the starting position of the multi-pulse train (see FIGS. 4A–4C), are input to the third MUX 712. The third MUX 712 selectively outputs one of the eight pulse signals to the write waveform generation unit 120, via the latch 720, depending on the type of optical recording medium used. The output of the third MUX 712 is a multi-pulse train start signal S_SMP that indicates the starting position of the multi-pulse train.

Also, the third shift register 706 outputs 10 pulse signals (second setting signals) with an interval of 0.5T therebetween, wherein the last one of the 10 pulse signals is shifted by 5T. The first through eighth pulse signals of the 10 pulse signals from the third shift register 706, which correspond to the setting points C_SLP[2 . . . 0] for the starting position of the last pulse (see FIGS. 4A–4C), are input to the fourth MUX 714. The fourth MUX 714 selectively outputs one of the eight pulse signals to the write waveform generation unit 120, via the latch 720, depending on the type of optical recording medium used. The output of the fourth MUX 714 is a last pulse start signal S_SLP that indicates the starting position of the last pulse.

The second through ninth pulse signals of the 10 pulse signals from the third shift register 706, which correspond to the setting points C_ELP[2 . . . 0] for the ending position of the last pulse (see FIGS. 4A–4C), are input to the fifth MUX 716. The fifth MUX 716 selectively outputs one of the eight pulse signals to the write waveform generation unit 120, via the latch 720, depending on the type of optical recording medium used. The output of the fifth MUX 716 is a last pulse end signal S_ELP that indicates the ending position of the last pulse. The third through tenth pulse signals of the 10 pulse signals from the second shift register 704, which correspond to the setting points C_ELC[2 . . . 0] for the ending position of the cooling pulse (see FIGS. 4A–4C), are input to the sixth MUX 718. The sixth MUX 718 selectively outputs one of the eight pulse signals to the write waveform generation unit 120, via the latch 720, depending on the type of optical recording medium used. The output of the sixth MUX 718 is a cooling pulse end signal S_ELC that indicates the ending position of the cooling pulse.

Selection signals for selecting the first through sixth MUXs 708 through 718 are looked up in shift table storage unit 104 which stores Table 1. The driver microcomputer 102 reads the based setting point values C_SFP[2 . . . 0], C_EFP[2 . . . 0], C_SMP[2 . . . 0], C_SLP[2 . . . 0], C_ELP[2 . . . 0] and C_ELC[2 . . . 0] from the table depending on which optical recording medium is being used, and outputs selection signals for the first through sixth MUXs 708 through 718.

The gate 722 generates signals for generating the multi-pulse train. In particular, the gate 722 essentially generates a fixed-width multi-pulse train signal MP, which is obtained by AND-gating the NRZI signal from the first shift register 700 with a system clock signal. Also, the output of gate 722 is a variable-width multi-pulse start signal MP_S, which is synchronized with the fixed-width multi-pulse train signal MP, and a variable-width multi-pulse train end signal MP_E delayed slightly with respect to the variable-width multi-pulse train start signal MP_S.

The latch 720 receives the first pulse start signal S_SFP from the first MUX 708, the first pulse end signal S_EFP from the second MUX 710, the multi-pulse start signal S_SMP from the third MUX 712, the last pulse start signal S_SLP from the fourth MUX 714, the last pulse end signal S_ELP from the fifth MUX 716, the cooling pulse end signal S_ELC from the sixth MUX 718 and the fixed-width multi-pulse signal MP from the gate 722, latches the input signals such that they are synchronized with the system clock, and outputs the resultant signals. The reason for the latching is that these signals may be asynchronized because they are processed through different paths.

Figure 8:
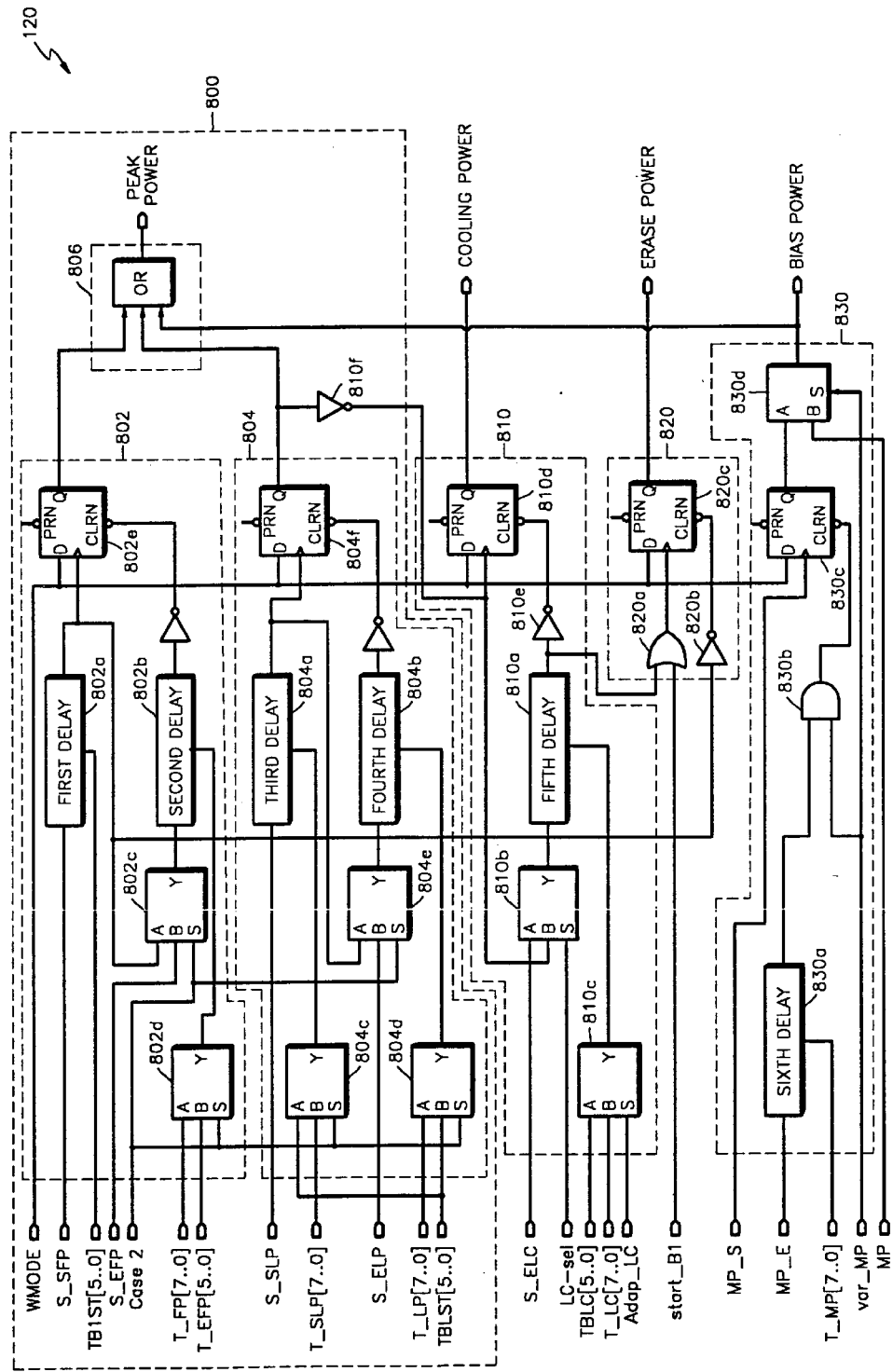
FIG. 8 is a block diagram showing the structure of a write waveform generation unit of FIG. 6, the waveforms of which are illustrated in FIGS. 5A–5E.

FIG. 8 is a block diagram showing the structure of a write waveform generation unit 120 of FIG. 6. The write waveform generation unit 120 includes a peak power control signal generation portion 800, a cooling power control signal generator 810, an erase power control signal generator 820, and a multi-pulse train generator 830.

In particular, the peak power control signal generation portion 800, which includes a first pulse generator 802, a last pulse generator 804 and a gate 806, receives the first pulse start signal S_SFP, the first pulse end signal S_EFP, the last pulse start signal S_SLP, the last pulse end signal S_ELP and the bias power control signal BIAS POWER from the multi-pulse train generator 830, to generate the peak power control signal PEAK POWER shown as the FIG. 2E waveform. In particular, the first pulse generator 802 receives the first pulse start signal S_SFP and the first pulse end signal S_EFP from the base signal generation unit 106, to generate a first pulse. The last pulse generator 804 receives the last pulse start signal S_SLP and the last pulse end signal S_ELP from the base signal generation unit 106, to generate a last pulse. The gate 806 performs an OR operation on the first pulse from the first signal generator 802, the last pulse from the last pulse generator 804, and the bias power control signal BIAS POWER from the multi-pulse train generator 830, resulting in the peak power control signal PEAK POWER shown in the FIG. 2E waveform.

Generally, the cooling power control signal generator 810 receives the cooling pulse end signal S_ELC from the base signal generation unit 106 and the last pulse from the last pulse generator 804 to generate the cooling power control signal COOLING POWER shown in the FIG. 2F waveform. The erase power control signal generator 820 receives the first pulse start signal S_SFP and the cooling pulse end signal S_ELC to generate the erase power control signal ERASE POWER shown in the FIG. 2D waveform. The multi-pulse train generator 830 receives the fixed-width multi-pulse signal MP, the variable-width multi-pulse start signal MP_S and the variable-width multi-pulse end signal MP_E, which are provided by the base signal generation unit 106, to generate the bias power control signal BIAS POWER shown in the FIG. 2C waveform. The operation of the cooling power control signal generator 810, the erase power control signal generator 820 and the multi-purpose train generator 830 are described in detail below.

In particular, the first pulse generator 802 of the peak power control signal generation portion 800 includes a first delay 802a, a second delay 802b, multiplexers 802c and 802d, and a first latch 802e. The first delay 802a delays the first pulse start signal S_SFP from the base signal generation unit 106 by a period of time set by a signal TB1ST[5 . . . 0] from the shift table storage unit 104. By the operation of the first delay 802a, the rising edge of the first pulse can be shifted.

The second delay 802b delays the first pulse end signal S_EFP from the base signal generation unit 106 by a period of time set by a signal T_FP[7 . . . 0] or T_EFP[5 . . . 0] from the shift table storage unit 104. By the operation of the second delay 802b, the falling edge of the first pulse can be shifted. Selection of the signal T_FP[7 . . . 0] or T_EFP[5 . . . 0] is controlled by a signal Case2. The write pulse shift mode includes a variable-width mode Case1 for varying the width of the write pulse, and a position shift mode Case2 for shifting the position of the write pulse.

The outputs from the first and second delays 802a and 802b are applied as clock and reset signals, respectively, for the first latch 802e. The first latch 802e is enabled by a write mode control signal WMODE, is set by the output from the first delay 802a, and is reset by the output from the second delay 802b. The first pulse, which has a rising edge set by the first pulse start signal S_SFP and a falling edge set by the first pulse end signal S_EFP, is obtained by the operation of the first latch 802e. In the adaptive record mode, the width of the first pulse is determined by the signal T_FP[7 . . . 0] or T_EFP[5 . . . 0].

The last pulse generator 804 includes a third delay 804a, a fourth delay 804b, multiplexers 804c, 804d and 804e and a second latch 804f. The third delay 804a delays the last pulse start signal S_SLP from the base signal generation unit 106 by a period of time set by a signal T_SLP[7 . . . 0] or TBLST[5 . . . 0] from the shift table storage unit 104. By the operation of the third delay 804a, the rising edge of the last pulse can be shifted. Selection of the signals T_SLP[7 . . . 0] or TBLST[5 . . . 0] is controlled by the signal Case2. The fourth delay 804b delays the last pulse end signal S_ELP from the base signal generation unit 106 by a period of time set by a signal T_LP[7 . . . 0] or TBLST[5 . . . 0] from the shift table storage unit 104. By the operation of the fourth delay 804b, the falling edge of the last pulse can be shifted. Selection of the signal T_LP[7 . . . 0] or TBLST[5 . . . 0] is controlled by the signal Case2. Signals WMODE, Case2, LC_sel, Adap_LC, start_B1, and var_MP are provided by micro computer 102.

The outputs of the third and fourth delays 804a and 804b are applied as clock and reset signals, respectively, for the second latch 804f. The second latch 804f is enabled by the write mode control signal WMODE, is set by the output from the third delay 804a, and is reset by the output from the fourth delay 804b. The last pulse, which has a rising edge set by the last pulse start signal S_SLP and a falling edge set by the last pulse end signal S_ELP, is obtained by the operation of the second latch 804f. In the adaptive record mode, the width of the last pulse is determined by the signal T_SLP[7 . . . 0], T_LP[7 . . . 0] or TBLST[5 . . . 0].

The gate 806 of the power peak control signal generation portion 800 performs an OR-operation on the first pulse from the first signal generator 802, the last pulse from the last pulse generator 804 and the bias control signal BIAS POWER from the multi-pulse train generator 830, and outputs the operation result.

The cooling power control signal generator 810 of the write waveform generation unit 120 includes a fifth delay 810a, multiplexers 810b and 810c, a third latch 810d and inverters 810e and 810f. The fifth delay 810a delays the cooling pulse end signal S_ELC from the base signal generation unit 106 by a period of time set by a signal TBLC[5 . . . 0] or T_LC[7 . . . 0] from the shift table storage unit 104. Selection of the signal TBLC[5 . . . 0] or T_LC[7 . . . 0] is controlled by a signal Adap_LC. By the operation of the fifth delay 810a, the falling edge of the cooling pulse can be controlled. The rising edge of the cooling pulse is set by the output from the last pulse generator 804 or the cooling pulse end signal S_ELC. The multiplexer 810b selects the output from the last pulse generator 804 or the cooling pulse end signal S_ELC in response to a signal LC_sel.

The outputs of the inverter 810f and the fifth delay 810a are applied as clock and reset signals, respectively, for the third latch 810d. The third latch 810d is enabled by the write mode control signal WMODE, is set by the output from the inverter 810f, and is reset by the output from the fifth delay 810d. The cooling power control signal, which has a rising edge set by the cooling pulse end signal S_ELC and a falling edge set by the last pulse end signal S_ELP from the last pulse generator 804, is obtained by the operation of the third latch 810a. In the adaptive record mode, the width of the cooling power control signal is determined by the signal TBLC[5 . . . 0] or T_LC[7 . . . 0].

The erase power control signal generator 820 of the write waveform generation unit 120 includes an OR gate 820a, an inverter 820b and a fourth latch 820c. The OR gate 820a performs an OR-operation on the output from the fifth delay 810a and a signal start_B1, and outputs the operation result. The inverter 820b inverts the output from the first delay 802a of the first pulse generator 802, and outputs the inverted result. The fourth latch 820c is enabled by the write mode control signal WMODE, is set by the output from the OR gate 820a, and is reset by the output from the inverter 820b. The erase power signal, which has a rising edge set by the output from the OR gate 820a and a falling edge set by the output from the inverter 820b, is obtained by the operation of the fourth latch 820c.

The multi-pulse train generator 830 of the write waveform generation unit 120 includes a sixth delay 830a, an AND gate 830b, a fifth latch 830c and a multiplexer 830d. The sixth delay 830a delays the variable-width multi-pulse train end signal MP_E from the base signal generation unit 106 by a period of time set by a signal T_MP [7 . . . 0] from the shift table storage unit 104. By the operation of the sixth delay 830a, the width of the multi-pulse train can be varied. The AND gate 830b performs an AND-operation on the output from the sixth delay 830a and a signal var_MP, and outputs the operation result. The signal var_MP is for enabling or disabling the variation of the multi-pulse train.

The variable-width multi-pulse start signal MP_S from the base signal generation unit 106, and the output from the AND gate 830b are applied as clock and reset signals, respectively, for the fifth latch 830c. The fifth latch 830c is enabled by the write mode control signal WMODE, is set by the variable-width multi-pulse start signal MP_S, and is reset by the output from the AND gate 830b. The multi-pulse train that has a variable width can be obtained by the operation of the fifth latch 830c. The multiplexer 830d selectively outputs the output from the fifth latch 830c or the fixed-width multi-pulse signal MP from the base signal generation unit 106, in response to the signal var_MP.

The write waveform generation unit shown in FIG. 8 can be applied to generate write pulses for two channels. For generation of write pulses for two channels, which have only bias and peak levels, the erase power control signal ERASE POWER shown in the FIG. 2G waveform is used instead of that shown in the FIG. 2D waveform.

As described above, the recording apparatus according to the present invention can store write pulses, which are adaptive to various optical recording media, in the form of timing data, and generate base signals based on the timing data. Also, the write pulse control signals can be generated by the base signals, which control timing of the write pulses such that optical recording can be realized adaptively to various optical recording media.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording apparatus which is adaptive to various optical recording media in response to an NRZI signal, the recording apparatus comprising:

a microcomputer which stores timing data for each optical recording medium, wherein a first base point for the timing data which represent starting and ending positions of a first pulse and a starting position of a multi-train pulse precedes a rising edge of a mark by 1T and a second base point for the timing data which represent a starting and ending position of the last pulse and an ending position of a cooling pulse precedes a falling edge of the mark by 3T, where T is a cycle of a reference clock;

a base signal generator which generates a first base signal indicating the first base point and a second base signal indicating the second base point, in synchronism with the NRZI signal, wherein the base signal generator comprises;

a first shift register which shifts the first base signal to generate a plurality of first setting signals which are equally spaced apart by a fraction of the cycle of the reference clock;

first, second and third multiplexers which multiplex the first setting signals from the first shift register and the timing data from the microcomputer to generate a first pulse start signal, a first pulse end signal and a multi-pulse train start signal, wherein the starting and ending positions of the first pulse and the starting position of the multi-train pulse are set to coincide with one of the plurality of first setting signals;

a second shift register which shifts the second base signal to generate a plurality of second setting signals which are equally spaced apart by the fraction of the cycle of the reference clock;

fourth, fifth and sixth multiplexers which multiplex the second setting signals from the second shift register and the timing data from the microcomputer to generate a last pulse start signal, a last pulse end signal and a cooling pulse end signal, wherein the starting and ending positions of the last pulse and the ending position of the cooling pulse are set to coincide with one of the plurality of second setting signals; and a first gate which performs an AND-operation on the NRZI signal and a clock signal to generate a fixed-width multi-pulse signal;

a write waveform generation unit which generates the write pulse control signals in response to the base signals from the base signal generation unit and the fixed-width multi-pulse signal;

a laser diode; and a laser diode driver which drives the laser diode in response to the write pulse control signals.

2. The recording apparatus of claim 1, wherein the first multiplexer outputs the first pulse start signal by selecting one of the first setting signals from the first shift register according to the timing data indicating the starting position of the first pulse;

the second multiplexer outputs the first pulse end signal by selecting one of the first setting signals from the first shift register according to the timing data indicating the ending position of the first pulse;

the third multiplexer outputs the multi-pulse train start signal by selecting one of the first setting signals from the first shift register according to the timing data indicating the starting position of the multi-pulse train;

the fourth multiplexer outputs the last pulse start signal by selecting one of the second setting signals from the second shift register according to the timing data indicating the starting position of the last pulse;

the fifth multiplexer outputs the last pulse end signal by selecting one of the second setting signals from the second shift register according to the timing data indicating the ending position of the last pulse; and the sixth multiplexers outputs the cooling pulse end signal by selecting one of the second setting signals from the second shift register according to the timing data indicating the ending position of the cooling pulse.

3. The recording apparatus of claim 2, further comprising a latch which latches the outputs from the first through sixth multiplexers to be synchronized with the clock signal and outputting the resultant signals.

4. The recording apparatus of claim 3, wherein the gate generates a variable-width multi-pulse start signal which is synchronized with the fixed-width multi-pulse signal, and a variable-width multi-pulse end signal which is delayed by a predetermined period of time relative to the variable-width multi-pulse start signal.

5. The recording apparatus of claim 4, wherein the write waveform generation unit comprises:

a peak power control signal generation portion which receives the first pulse start signal, the first pulse end signal, the multi-pulse train start signal, the last pulse start signal and the last pulse end signal from the base signal generation unit, to generateda peak power control signal;

a cooling power control signal generator which receives the last pulse end signal and the cooling pulse end signal from the base signal generation unit, to generate a cooling power control signal;

an erase power control signal generator which receives the first pulse start signal and the cooling pulse end signal from the base signal generation unit, to generate an erase power control signal; and a multi-pulse train generator which receives the fixed-width multi-pulse signal, the variable-width multi-pulse start signal, and the variable-width multi-pulse end signal from the base signal generation unit, to generate a bias power control signal.

6. The recording apparatus of claim 5, wherein the peak power control signal generation portion comprises:

a first pulse generator which receives the first pulse start signal and the first pulse end signal to generate a first pulse;

a last pulse generator which receives the last pulse start signal and the last pulse end signal to generate a last pulse; and a second gate which performs an OR-operation on the first pulse signal, the last pulse signal and the bias power control signal which is output from the multi-pulse train generator.

7. The recording apparatus of claim 6, wherein the first pulse generator further comprises a first latch which generates the first pulse from when the first pulse start signal is generated until when the first pulse end signal is generated, and the last pulse generator further comprises a second latch which generates the last pulse from when the last pulse start signal is generated until when the last pulse end signal is generated.

8. The recording apparatus of claim 7, wherein the recording apparatus further comprises a shift table storage unit which stores a table associated with shift values of a mark in a time domain, based on a correlation of the mark of the NRZI signal and the preceding and following spaces of the mark, the first pulse generator further comprises first and second delays which delay the first pulse start signal and the first pulse end signal, respectively, based on a shift value from the shift table storage unit, and the last pulse generator further comprises third and fourth delays which delay the last pulse start signal and the last pulse end signal, respectively, based on another of the shift values from the shift table storage unit.

9. The recording apparatus of claim 8, further comprising a fifth delay which delays the cooling pulse end signal based on a shift value from the shift table storage unit.

10. The recording apparatus of claim 8, wherein the multi-pulse train generator further comprises a fifth delay which delays the variable-width multi-pulse end signal based on a shift value from the shift table storage unit.

11. The recording apparatus of claim 5, wherein the cooling power control signal generator comprises a third latch which generates the cooling power control signal which is started by the cooling pulse end signal from the base signal generation unit and is ended by the last pulse end signal from the last pulse generator.

12. The recording apparatus of claim 11, further comprising a fifth delay which delays the cooling pulse end signal based on a shift value from the shift table storage unit.

13. The recording apparatus of claim 12, wherein the erase power control signal generator comprises a fourth latch which generates the erase power control signal from the generation of the output from the first delay to the generation of the output of the fifth delay.

14. The recording apparatus of claim 13, wherein the multi-pulse train generator further comprises a sixth delay which delays the variable-width multi-pulse end signal based on a shift value from the shift table storage unit.

15. The recording apparatus of claim 5, wherein the multi-pulse train generator comprises:
   a latch which generates a variable-width multi-pulse signal from when the variable-width multi-pulse start signal is generated until when the variable-width multi-pulse end signal is generated, the variable width multi-pulse start signal and the variable-width multi-pulse end signal from the base signal generation unit; and
   a multiplexer which selectively outputs the variable-width multi-pulse signal from the latch or the fixed-width multi-pulse signal from the base signal generation unit.

16. A recording apparatus which is adaptive to recording marks on each of a plurality of optical recording media, the recording apparatus comprising:
   a microcomputer which stores timing data for generating signals for recording the marks on each of the plurality of optical recording media;
   a base signal generation unit which generates base signals based on the stored timing, in synchronism with an input nonreturn to zero inverted (NRZI) signal, the base signal generator comprising:
      base signal generator which generates a first base signal indicating a first base point and a second base signal indicating a second base point, in synchronism with the NRZI signal,
      a first shift register which shifts the first base signal to generate first setting signals,
      first, second and third multiplexers which receive the first setting signals from the first shift register and the timing data from the microcomputer to generate a first pulse start signal, a first pulse end signal and a multi-pulse train start signal,
      a second shift register which shifts the second base signal to generate second setting signals,
      fourth, fifth and sixth multiplexers which receive the second setting signals from the second shift register and the timing data from the microcomputer to generate a last pulse start signal, a last pulse end signal and a cooling pulse end signal, and
      a first gate which performs an AND-operation on the NRZI signal and a clock signal to generate a fixed-width multi-pulse signal;
   a write waveform generation unit which generates the write pulse control signals in response to the base signals from the base signal generation unit;
   a laser diode; and
   a laser diode driver which drives the laser diode in response to the write pulse control signals from the write waveform generation unit.

17. The recording apparatus of claim 16, wherein:
   the first multiplexer outputs the first pulse start signal by selecting one of the first setting signals from the first shift register according to the timing data indicating the starting position of the first pulse;
   the second multiplexer outputs the first pulse end signal by selecting one of the first setting signals from the first shift register according to the timing data indicating the ending position of the first pulse;
   the third multiplexer outputs the multi-pulse train start signal by selecting one of the first setting signals from the first shift register according to the timing data indicating the starting position of the multi-pulse train;
   the fourth multiplexer outputs the last pulse start signal by selecting one of the second setting signals from the second shift register according to the timing data indicating the starting position of the last pulse;
   the fifth multiplexer outputs the last pulse end signal by selecting one of the second setting signals from the second shift register according to the timing data indicating the ending position of the last pulse; and
   the sixth multiplexers outputs the cooling pulse end signal by selecting one of the second setting signals from the second shift register according to the timing data indicating the ending position of the cooling pulse.

18. The recording apparatus of claim 17, further comprising a latch which latches the outputs from the first through sixth multiplexers to be synchronized with the clock signal and outputting the resultant signals.

19. The recording apparatus of claim 18, wherein the gate generates a variable-width multi-pulse start signal which is synchronized with the fixed-width multi-pulse signal, and a variable-width multi-pulse end signal which is delayed by a predetermined period of time relative to the variable-width multi-pulse start signal.

20. The recording apparatus of claim 19, wherein the write waveform generation unit comprises:
   a peak power control signal generation portion which receives the first pulse start signal, the first pulse end signal, the multi-pulse train start signal, the last pulse start signal and the last pulse end signal from the base signal generation unit, to generate a peak power control signal;
   a cooling power control signal generator which receives the last pulse end signal and the cooling pulse end signal from the base signal generation unit, to generate a cooling power control signal;
   an erase power control signal generator which receives the first pulse start signal and the cooling pulse end signal from the base signal generation unit, to generate an erase power control signal; and
   a multi-pulse train generator which receives the fixed-width multi-pulse signal, the variable-width multi-pulse start signal, and the variable-width multi-pulse end signal from the base signal generation unit, to generate a bias power control signal.

21. The recording apparatus of claim 20, wherein the peak power control signal generation portion comprises:

a first pulse generator which receives the first pulse start signal and the first pulse end signal to generate a first pulse;

a last pulse generator which receives the last pulse start signal and the last pulse end signal to generate a last pulse; and a second gate which performs an OR-operation on the first pulse signal, the last pulse signal and the bias power control signal which is output from the multi-pulse train generator.

22. The recording apparatus of claim 21, wherein the first pulse generator further comprises a first latch which generates the first pulse from when the first pulse start signal is generated until when the first pulse end signal is generated, and the last pulse generator further comprises a second latch which generates the last pulse from when the last pulse start signal is generated until when the last pulse end signal is generated.

23. The recording apparatus of claim 20, wherein the recording apparatus further comprises a shift table storage unit which stores a table associated with shift values of a mark in a time domain, based on a correlation of the mark of the NRZI signal and the preceding and following spaces of the mark, the first pulse generator further comprises first and second delays which delay the first pulse start signal and the first pulse end signal, respectively, based on a shift value from the shift table storage unit, and the last pulse generator further comprises third and fourth delays which delay the last pulse start signal and the last pulse end signal, respectively, based on another of the shift values from the shift table storage unit.

24. The recording apparatus of claim 23, further comprising a fifth delay which delays the cooling pulse end signal based on a shift value from the shift table storage unit.

25. The recording apparatus of claim 23, wherein the multi-pulse train generator further comprises a fifth delay which delays the variable-width multi-pulse end signal based on a shift value from the shift table storage unit.

26. The recording apparatus of claim 20, wherein the cooling power control signal generator comprises a third latch which generates the cooling power control signal which is started by the cooling pulse end signal from the base signal generation unit and is ended by the last pulse end signal from the last pulse generator.

27. The recording apparatus of claim 26, further comprising a fifth delay which delays the cooling pulse end signal based on a shift value from the shift table storage unit.

28. The recording apparatus of claim 27, wherein the erase power control signal generator comprises a fourth latch which generates the erase power control signal from the generation of the output from the first delay to the generation of the output of the fifth delay.

29. The recording apparatus of claim 28, wherein the multi-pulse train generator further comprises a sixth delay which delays the variable-width multi-pulse end signal based on a shift value from the shift table storage unit.

30. The recording apparatus of claim 20, wherein the multi-pulse train generator comprises:

a latch which generates a variable-width multi-pulse signal from when the variable-width multi-pulse start signal is generated until when the variable-width multi-pulse end signal is generated, the variable width multi-pulse start signal and the variable-width multi-pulse end signal from the base signal generation unit; and a multiplexer which selectively outputs the variable-width multi-pulse signal from the latch or the fixed-width multi-pulse signal from the base signal generation unit.

* * * * *